United States Patent
Stephenson

(10) Patent No.: US 8,620,974 B2
(45) Date of Patent: Dec. 31, 2013

(54) PERSISTENT FILE REPLACEMENT MECHANISM

(75) Inventor: Marc J. Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/878,613

(22) Filed: Sep. 9, 2010

(65) Prior Publication Data

US 2012/0066274 A1    Mar. 15, 2012

(51) Int. Cl.
*G06F 17/30*    (2006.01)

(52) U.S. Cl.
USPC ........................................... 707/825

(58) Field of Classification Search
USPC ................................. 707/825, 822
See application file for complete search history.

(56) References Cited

U.S. PATENT DOCUMENTS

| | | | |
|---|---|---|---|
| 5,513,351 A * | 4/1996 | Grantz | 707/692 |
| 6,434,744 B1 | 8/2002 | Chamberlain et al. | |
| 7,073,172 B2 | 7/2006 | Chamberlain | |
| 2007/0130232 A1 * | 6/2007 | Therrien et al. | 707/204 |
| 2007/0220068 A1 * | 9/2007 | Thompson et al. | 707/203 |
| 2011/0173607 A1 * | 7/2011 | Murphey et al. | 718/1 |

OTHER PUBLICATIONS

"U.S. Appl. No. 13/458,752 Office Action", Dec. 20, 2012, 14 pages.

* cited by examiner

*Primary Examiner* — Joshua Bullock
(74) *Attorney, Agent, or Firm* — DeLizio Gilliam, PLLC

(57) ABSTRACT

An original file of a versioned WPAR, that is incompatible with a global operating system, can be persistently replaced with a corresponding replacement file that is compatible with the global operating system. For this, the original file can be renamed and a symbolic link file can be created to reference the replacement file instead of the original file. A software maintenance program can also be persistently replaced to preserve the replacement file and to maintain compatibility with the global operating system regardless of new instances of the original file delivered by the software maintenance program. The replacement file that corresponds to the original file can be identified and renamed. In response to detecting a new version of the original file, the new version of the original file can be renamed. A reference to the new version of the original file can be updated to reference the replacement file.

8 Claims, 5 Drawing Sheets

PERSISTENT FILE REPLACEMENT MECHANISM

BACKGROUND

Embodiments of the inventive subject matter generally relate to the field of operating systems and, more particularly, to a persistent file replacement mechanism.

Software maintenance procedures typically update/replace an older version of software and associated files to yield a most current version of the software and the associated files. Performing software maintenance such as installing software products, executing software patches, and reinstalling/rejecting software products can cause existing older versions of the files to be lost, previous patches to be overwritten or replaced, etc.

SUMMARY

Various embodiments for maintaining a replacement file that persistently replaces a corresponding original file are disclosed. At least one embodiment includes a computer program product for persistent file replacement. The computer program product comprises a computer readable storage medium having computer usable program code embodied therewith. The computer readable program code is configured to identify the replacement file that corresponds to the original file of a virtual operating system instance associated with an earlier version of an operating system. The earlier version of the operating system is earlier than a later version of the operating system associated with a kernel that supports the virtual operating system instance. In response to detecting an updated original file, the computer readable program code is configured to rename the updated original file of the virtual operating system instance, and then replace a first reference to the updated original file with a second reference to the replacement file.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
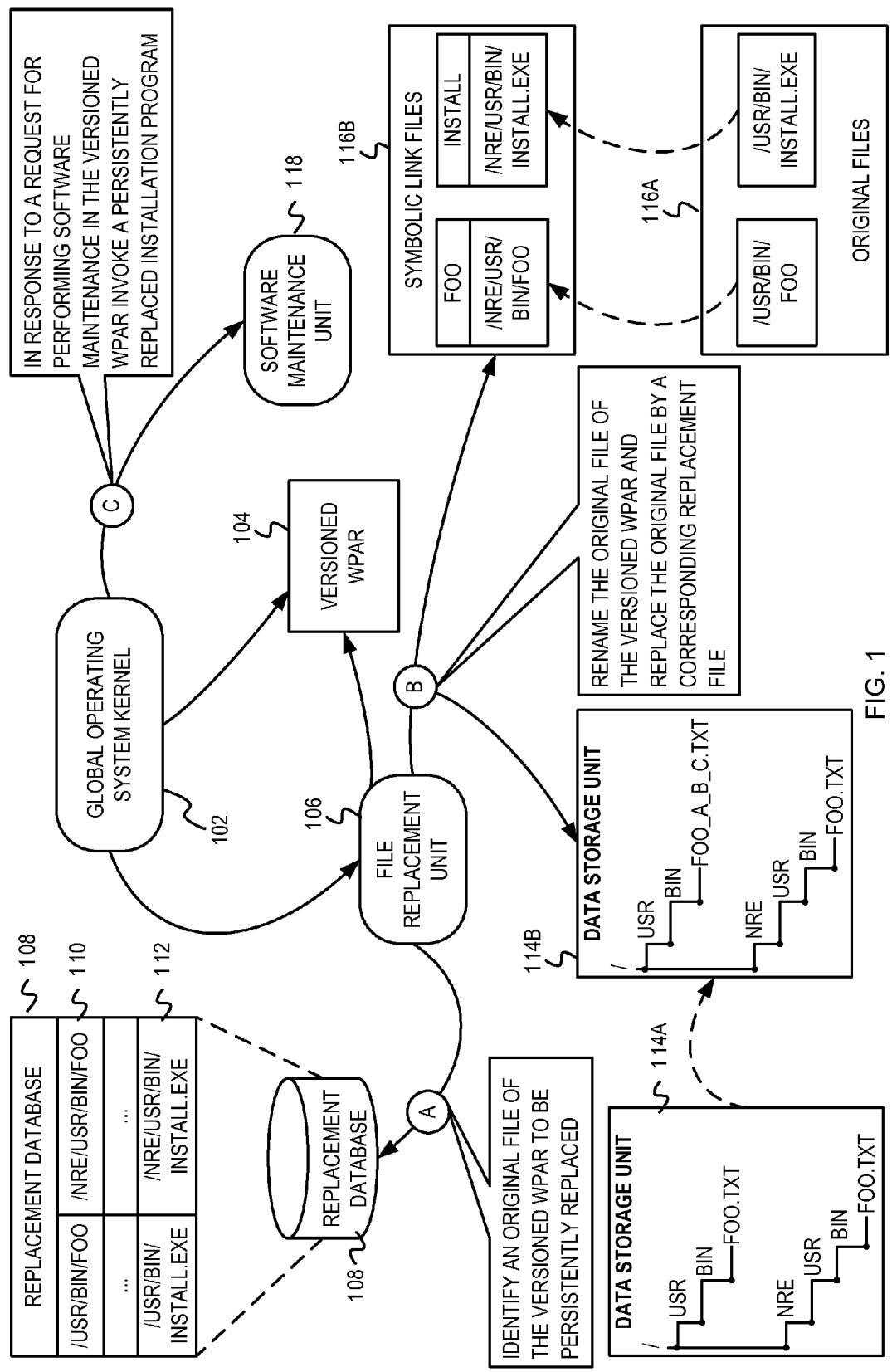
FIG. 1 is an example conceptual diagram illustrating example operations for persistently replacing files in a versioned WPAR.

The description that follows includes exemplary systems, methods, techniques, instruction sequences, and computer program products that embody techniques of the present inventive subject matter. However, it is understood that the described embodiments may be practiced without these specific details. For instance, although examples refer to persistently replacing files in a versioned workload partition (WPAR) with replacement files and maintaining the replacement files in the versioned WPAR that supports an IBM® Advanced Interactive Executive® (AIX) operating system, embodiments are not so limited. Operations described herein can also be implemented in other suitable operating systems, across other implementations of operating system-level virtualization (e.g., across containers/zones, virtual environments, virtual partitions, virtual machines, virtual private servers (VPS), etc.), and also in non-virtual environments. In other instances, well-known instruction instances, protocols, structures, and techniques have not been shown in detail in order not to obfuscate the description.

Organizations employ operating system virtualization or workload partitions (WPARs), also known as virtual operating systems or virtualized operating systems, to organize and to isolate workloads in accordance with business requirements, organizational guidelines, etc., while efficiently utilizing available equipment. For instance, an administrator can create different WPARs for a marketing department database and associated applications ("marketing database workload"), an accounting department database and associated applications ("accounting database workload"), and a legal department electronic mail server ("legal e-mail workload"). Instead of using three different servers, the resources of a single physical server can be used to satisfy the needs of the three workloads. Each WPAR presents to the respective hosted workload (i.e., processes, application(s) of the workload) as an instance of an operating system with its own namespace and process environment. The WPARs are isolated by ensuring that no WPARs access the same memory space or manage the same resource, thus precluding the need for running three different servers. Versioned WPARs (also known as compatibility runtime environment (CRE) WPARs) support an earlier version (e.g., version 5.2 of an IBM AIX operating system) of operating system libraries, scripts, and other content. The versioned WPAR is implemented on a source machine that supports a later version of the operating system (e.g., version 7.1 of the IBM AIX operating system).

In the versioned WPAR, certain software capabilities or hardware may be recognized only by the later version of the operating system (also called a global operating system). Therefore, content (e.g., files, commands, functions, etc.) linked to (or associated with) the earlier version of the operating system that is associated with the versioned WPAR may not be compatible with the later version of the operating system. For example, programs that are used to populate the versioned WPAR that supports version 5.2 of the AIX operating system may not be compatible or consistent with the global (version 7.1) operating system because the programs may not support the concept of versioned WPARs (e.g., because the concept of versioned WPARs did not exist in version 5.2 of the AIX operating system).

A process for persistent file replacement can be implemented to persistently replace the files of the versioned WPAR, that are incompatible with the global operating system, with corresponding replacement files. The files within the versioned WPAR that are to be persistently replaced are herein referred to as "original files", while the files that replace the original files are herein referred to as "replacement files". The replacement files are linked to the global operating system and, therefore, are compatible with the global operating system. To persistently replace an original file with a corresponding replacement file, the original file can be renamed and a symbolic link file can be created to reference the replacement file instead of the original file. For example, if changes at the global operating system level or at the system level cause older versions of user-level commands to be incompatible with the global operating system, the older versions of user-level commands may be persistently replaced with corresponding commands that are compatible with the global operating system. In general, when an original file A is to be persistently replaced with replacement file Ap, the original file is renamed to A-, and the replacement file Ap takes its place on the system as A. This can ensure that the replacement file Ap is available to processes within the versioned WPAR and that any references to the original file are directed to the corresponding replacement file. This can also enable operation of the versioned WPAR while maintaining compatibility with the global operating system.

However, to enable certain functions in the versioned WPAR, software maintenance (e.g., software installation) procedures may be executed. Executing the software maintenance procedures may overwrite the replacement file with a new version of the original file. Because the new version of the original file is installed within the versioned WPAR, the new version of the original file (like the original file) is also linked to the earlier version of the operating system supported by the versioned WPAR. For example, an original file of the versioned WPAR may be persistently replaced with the replacement file because the original file does not anticipate the use of versioned WPARs. However, because the new version of the original file is also linked to the earlier version of the operating system, it is unlikely that the new version of the original file anticipates the use of the versioned WPARs. In other words, like the original file, the new version of the original file generated as part of the software maintenance procedures may also be incompatible with the global operating system. Furthermore, replacing the original file of the versioned WPAR with the corresponding replacement file may cause execution of the software maintenance procedures to generate an error because the software maintenance procedures expect to operate upon the original file, rather than the replacement file. Characteristics (e.g., file size, checksum, etc.) of the original files may differ from the corresponding replacement files. The software maintenance procedures may compare characteristics of the replacement file with the expected characteristics (i.e., the characteristics of the original file) and may generate an error on determining that the expected characteristics do not match the characteristics of the replacement file.

The process for persistent file replacement can be further configured to update the software maintenance procedures (e.g., persistently replace an original software maintenance program with a replacement software maintenance program) to preserve the replacement file and to maintain compatibility with the global operating system regardless of whether the software maintenance procedures deliver new instances of the original file. In accordance with the updated software maintenance procedures, it can be determined whether any persistently replaced original files will be altered as a result of the software maintenance. If so, the corresponding replacement files can be temporarily renamed for the duration of the software maintenance. After the software maintenance is completed, the replacement files can be restored. This can enable software maintenance to be applied within the versioned WPAR while retaining the replacement files and maintaining compatibility with the global operating system.

Figure 2:
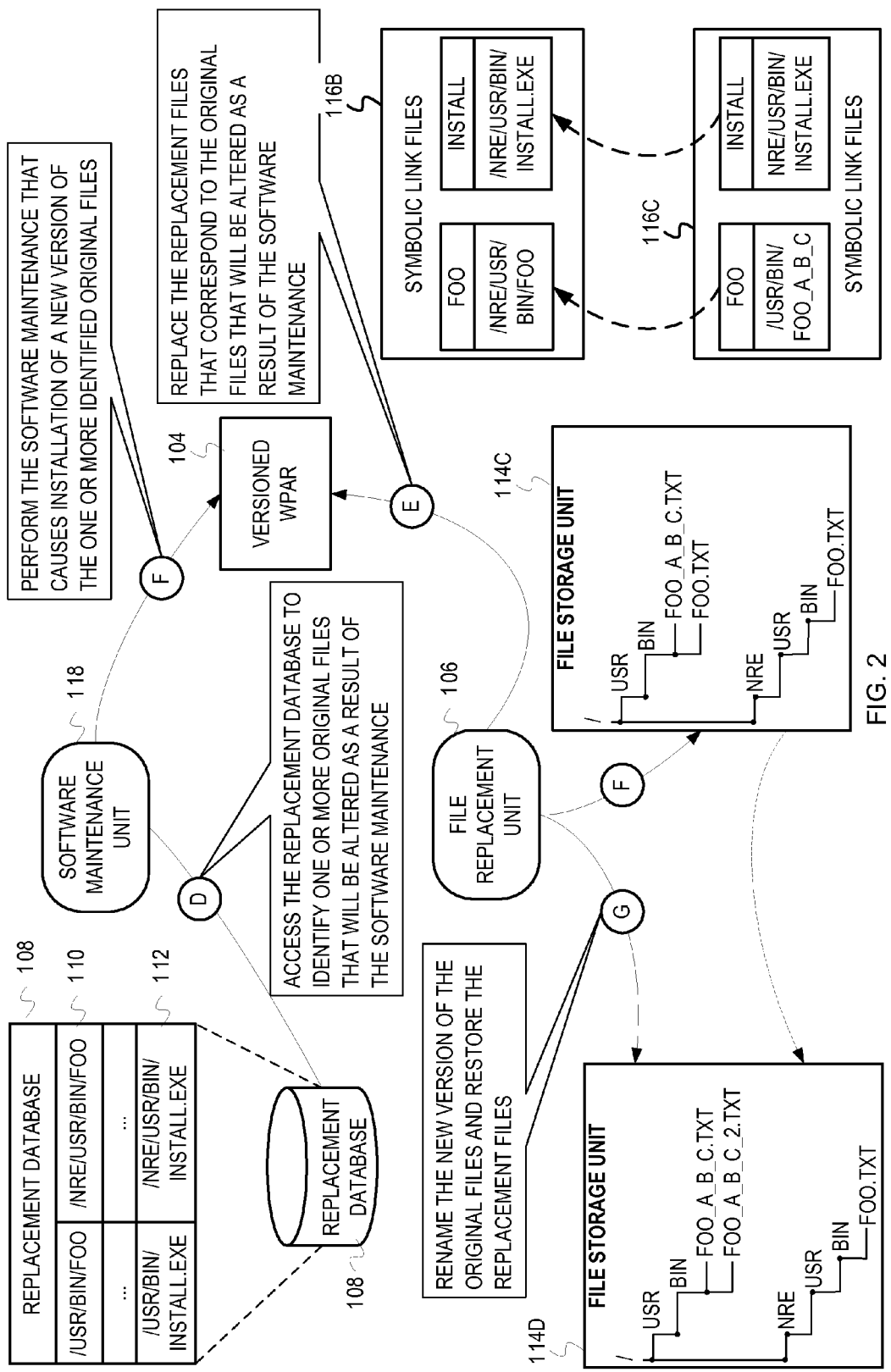
FIG. 2 is a continuation of FIG. 1 and depicts example operations for maintaining replacement files in the event of software maintenance of the versioned WPAR.

FIG. 1 and FIG. 2 depict an example conceptual diagram illustrating example operations for persistently replacing files in a versioned WPAR and for maintaining replacement files in the event of software maintenance of the versioned WPAR. FIG. 1 depicts a global operating system kernel 102, a versioned WPAR 104, a file replacement unit 106, and a software maintenance unit 118. The global operating system kernel 102 communicates with the file replacement unit 106 and the software maintenance unit 118. The file replacement unit 106 is coupled with a replacement database 108.

A WPAR management unit (not shown) can create the versioned WPAR 104 and other WPARs as software partitions within an operating system (not shown). The WPARs are contained environments that are created from and that share resources (e.g., memory, kernel, processors, network cards, hard drives, and/or other software, firmware, and/or hardware) of a single managing instance of the operating system. The managing instance of the operating system is also referred to as a global operating system. For example, the WPARs may share a common AIX kernel (i.e., the global operating system kernel 102) and may comprise their own file systems, users, administrators, network space, applications, processes, etc. Each of the WPARs within the global operating system can comprise applications and other workloads that execute independently within the contained environment of the WPAR.

In some implementations, the versioned WPAR 104 may be created on a physical machine. The global operating system that manages all the physical resources (e.g., memory, processor, drives, adapters, etc.) of the physical machine may allocate a subset of the physical resources to the versioned WPAR 104. The global operating system may also allocate virtual resources to the versioned WPAR 104. In other implementations, the versioned WPAR 104 may be implemented within a logical partition (LPAR) of the physical machine. An LPAR is generally a subset of the physical resources of the physical machine, where the subset is virtualized and where the LPAR can operate as a separate computing device and can manage the subset of the physical resources. An operating system can be installed on the LPAR and one or more WPARs can be created in the operating system of the LPAR. The operating system of the LPAR can allocate resources to the WPAR from the subset of the physical resources allocated to the LPAR. Also, the physical machine could comprise multiple LPARs, each LPAR could support a different operating system, and each LPAR could support multiple WPARs.

Although traditionally, the WPARs and the global operating system share an identical operating system (e.g., identical version, identical patches, identical tuning options, etc.), the versioned WPAR 104 is created to support a different version (typically an earlier version) of the operating system than the global operating system. The versioned WPAR 104 supports an earlier version of operating system libraries that are hosted by a later version of the global operating system. For example, the global operating system may be version 7.1 of an IBM AIX operating system, while the versioned WPAR 104 might support operating system libraries that are specific to version 5.2 of the IBM AIX operating system. Thus, scripts, processes, and other content within the versioned WPAR 104 are compiled on version 5.2 of the operating system and are linked to version 5.2 of the operating system. Although compiled on version 5.2 of the operating system, the processes, the libraries, the scripts, and other content communicate with the version 7.1 global operating system kernel 102. In some implementations, certain content (e.g., commands, functions, files, etc.) that are specific to the earlier version of the operating system may be insufficient to execute a certain task or may be incompatible with the global operating system (i.e., the later version of the operating system). Therefore, corresponding content that are specific to the later version of the operating system may replace the content of the earlier version of the operating system. Stages A-C of FIG. 1 describe operations for persistently replacing original files of the versioned WPAR with corresponding replacement files of the later version of the operating system. Stages D-G of FIG. 2 describe operations for preserving the replacement files after software maintenance procedures are executed within the versioned WPAR 104.

At stage A, the file replacement unit 106 accesses the replacement database 108 to identify one or more original files of the versioned WPAR 104 that are to be persistently replaced. As described above, some original files of the versioned WPAR 104 may be incompatible with the global operating system kernel 102. These original files that are specific to the earlier version of the operating system (supported by the versioned WPAR 104) may need to be replaced with corresponding replacement files that are compatible with the global operating system kernel 102. The replacement database 108 identifies the original files that are to be persistently replaced and corresponding replacement files. In FIG. 1, the replacement database 108 comprises entry 110 that identifies an original file /usr/bin/foo and corresponding replacement file /nre/usr/bin/foo. The replacement database 108 also comprises entry 112 that indicates an original file /usr/bin/install.exe and corresponding replacement file /nre/usr/bin/install.exe. A system administrator can identify the one or more original files that are to be persistently replaced, can identify the corresponding replacement files, and can populate the replacement database 108.

As part of creating the versioned WPAR 106, the global operating system kernel 102 invokes the file replacement unit 106. The file replacement unit 106 accesses the replacement database 108, identifies the original files of the versioned WPAR 104, and persistently replaces the identified original files with their corresponding replacement files as will be described in stage B. In one implementation, the replacement files may be part of a file system associated with the global operating system. The file system associated with the global operating system can be mounted to make the file system available within the versioned WPAR 104. In FIG. 1, data storage unit 114A represents an initial state of the data storage unit that comprises the original file /usr/bin/foo.txt and the replacement file /nre/usr/bin/foo.txt. It is noted that the original files of the versioned WPAR 104 that are to be persistently replaced may be executable files (e.g., software programs and applications), text files, configuration files, etc.

At stage B, the file replacement unit 106 renames each of the original files (identified by the patching database 108) of the versioned WPAR 104 and replaces the original files with their corresponding replacement files. The file replacement unit 106 renames the original file in accordance with a predetermined scheme so that the renamed original file can be identified and accessed (if necessary). To rename the original file, a known prefix and/or known suffix can be affixed to the name of the original file. Data storage unit 114B represents the state of the data storage unit 114A after the file replacement unit 106 renames the original file from /usr/bin/foo.txt to /usr/bin/foo_a_b_c.txt.

In addition to renaming the original file, the file replacement unit 106 also creates a symbolic link to reference the replacement file instead of the original file. Thus, any reference to the original file /usr/bin/foo.txt will be directed to the corresponding replacement file /nre/usr/bin/foo. txt. An example of a symbolic link includes a file that file systems can use as an indirect reference to a file. The content of the symbolic link file is the name of the file to which references will resolve. The set of original files 116A depicts the original files that are to be persistently replaced. In one example, one or more files of the set of original files 116A may be actual files (e.g., text files, multimedia files, executable files, etc.). The file replacement unit 106 can create symbolic link files that identify the replacement file that corresponds to the original file. In another example, one or more files of the set of original files 116A can be symbolic link files. The file replacement unit 106 can create a new symbolic link file that identifies the replacement file. The set of symbolic link files 116B depicts the symbolic link files that are created to reference the replacement files that correspond to the original files. As depicted by the set of symbolic link files 116B, symbolic link file foo is created to reference the replacement file /nre/usr/bin/foo. txt. The file replacement unit 106 can also augment system maintenance metadata associated with the original file to reflect the renamed original file (i.e., the new name of the original file, in this case, file_a_b_c.txt) and to identify the replacement file.

Furthermore, the file replacement unit 106 also persistently replaces an original software maintenance program (represented as /usr/bin/install.exe in the replacement database 108) associated with the versioned WPAR 104. The software maintenance unit 118 may execute the original software maintenance program for performing software maintenance operations including installing a new software product, updating/reinstalling/fixing installation/removing an existing software product, or executing interim fixes. The file replacement unit 106 can persistently replace the original software maintenance program with replacement software maintenance program (represented as /nre/usr/bin/install.exe in the replacement database 108). In FIG. 1, the set of original files 116A comprises the original software maintenance program /usr/bin/install.exe. The set of symbolic link files 116B depicts a symbolic link file install that is created to reference the replacement software maintenance program /nre/usr/bin/install. exe. By executing the replacement software maintenance program, the software maintenance unit 118 can determine whether the software maintenance will affect persistently replaced original files and their corresponding replacement files and can ensure that the replacement files are preserved even after the software maintenance is completed, as will be described with reference to stages C-G.

At stage C, the global operating system kernel 102 invokes the software maintenance unit 118 in response to a request for performing software maintenance in the versioned WPAR 104. As described above, the file replacement unit 106 persistently replaces the original software maintenance program with the replacement software maintenance program. On being invoked, the software maintenance unit 118 executes the replacement software maintenance program. The replacement software maintenance program enables the software maintenance unit 118 to detect whether the software maintenance will alter or affect replacement files that persistently replaced the original files.

At stage D in FIG. 2, the software maintenance unit 118 accesses the replacement database 108 to identify original files that will be altered as a result of the software maintenance. The software maintenance performed by the software maintenance unit 118 can include, among other operations, updates to one or more original files of the versioned WPAR 104 that were persistently replaced with the corresponding replacement files at stage B. As described in stage B, the file replacement unit 106 renames the original files and replaces the renamed original files with their corresponding replacement files. However, replacing the original files with the corresponding replacement files may result in errors when the software maintenance unit 118 attempts to perform software maintenance on the replacement files. This is because the software maintenance unit 118 may expect to encounter an original file and may instead encounter a replacement file, resulting in errors. Therefore, prior to performing the software maintenance within the versioned WPAR 104, the software maintenance unit 118 can identify the original files that will be altered by the software maintenance. As part of the replacement software maintenance program, the software maintenance unit 118 can query the replacement database 108 to determine whether any of the original files, to which the software maintenance is directed, have been persistently replaced. In one implementation, the software maintenance unit 118 can traverse the list of original files in the replacement database 108 and can determine whether any of the original files in the replacement database 108 will be altered by the software maintenance. In another implementation, the software maintenance unit 118 can identify files that will be deleted/modified/replaced/installed as a result of the software maintenance and can access the replacement database 108 to determine whether any of the identified files are present within the replacement database 108. In FIG. 2, the software maintenance unit 118 determines that the replacement file /nre/usr/bin/foo.txt will be altered by the software maintenance.

At stage E, the file replacement unit 106 replaces the replacement files that will be altered as a result of the software maintenance with their corresponding original files. In one implementation, as depicted in FIG. 1, the software maintenance unit 118 identifies and indicates the original files of the versioned WPAR 104 that will be altered as a result of the software maintenance to the file replacement unit 106. The software maintenance unit 118 can identify the original files that will be altered by a file name, by an index that corresponds to the original files in the replacement database 108, etc. The file replacement unit 106, in turn, can identify the appropriate replacement files. In another implementation, the software maintenance unit 118 can identify and indicate the replacement files (e.g., by a file name, by an index, etc.) that will be altered by the software maintenance. The file replacement unit 106 replaces the symbolic link file that references the replacement file with the corresponding original file. The replacement file may not be renamed.

With reference to the data storage unit 114B of FIG. 1, the file replacement unit 106 in conjunction with the software maintenance unit 118 determines that the replacement file /nre/usr/bin/ foo. txt will be altered by the software maintenance. The file replacement unit 106, therefore, replaces the symbolic link file to the replacement file /nre/usr/bin/foo.txt depicted in the set of symbolic link files 116B with the corresponding original file as depicted by the set of symbolic link files 116C of FIG. 2. As depicted by the set of symbolic link files 116C, the symbolic link file foo references the original file /usr/bin/foo_A_B_C.txt In other words, the file replacement unit 106 temporarily reinstates the previously replaced original file of the versioned WPAR 104 so that software maintenance can be performed on the original file of the versioned WPAR 104. In some implementations, the original file may be renamed back to its original name (e.g., the original file /usr/bin/foo_A_B_C.txt may be renamed to /usr/bin/foo.txt) before it temporarily replaces the replacement file prior to the software maintenance. In another implementation, the software maintenance unit 118 may not invoke the replacement unit 102. Instead, the software maintenance unit 118 may itself execute operations for identifying the replacement file and for temporarily substituting the replacement file with the corresponding original file.

At stage F, the software maintenance unit 118 performs the software maintenance of the versioned WPAR 104 that causes installation of a new version of the original files. The new version of the original file typically has the same name as the original file (prior to renaming at stage B) and the same name as the replacement file. The new version of the original file may be installed as part of installing/re-installing/partially installing/ upgrading/rejecting (reverting to a previous version) a software product. The new version of the original file may be installed in the same location as the original file. Because the original file and the replacement file were both renamed, the new version of the original file does not conflict with the original file and the replacement file. In FIG. 1, the software maintenance unit 118 installs a new version of the original file, represented as /usr/bin/foo.txt in the data storage unit 114C. The new version of the original file /usr/bin/foo.txt may be installed as part of installing a software program within the versioned WPAR 104. In the data storage unit 114C, the original file is represented as /usr/bin/foo_A_B_C.txt and the replacement file is represented as /nre/usr/bin/foo.txt. However, the new version of the original file is still linked to the earlier version of the operating system (i.e., the version of the operating system that is supported by the versioned WPAR) and, as in the case of the original file, may not be supported/compatible with the global operating system kernel 102. Therefore, after the software maintenance unit 118 completes software maintenance in the versioned WPAR 104, the software maintenance unit 118 invokes the replacement unit 102 to replace the new version of the original files (installed at stage F) with their corresponding replacement files as described in stage G.

At stage G, the file replacement unit 106 renames the new version of the original files and restores the replacement files. In some implementations, as depicted in FIG. 2, the software maintenance unit 118 invokes the file replacement unit 106 after the software maintenance is performed within the versioned WPAR 104. The file replacement unit 106 renames the new version of the original file (represented as /usr/bin/foo.txt in the data storage unit 114C). Data storage unit 114D represents the state of the data storage unit 114C after the file replacement unit 106 renames the new version of the original file. In the data storage unit 114D, the new version of the original file is represented as /usr/bin/foo A_B_C_2.txt. The symbolic link file to the replacement file that was temporarily replaced with the original file (at stage E) is now reinstated. For this, the symbolic link file to the replacement file can replace the new version of the original file. Thus, any references to the new version of the original file are directed to the symbolic link file which, in turn, references the replacement file, as depicted by the set of symbolic link files 116B. Thus, any subsequent references to foo will be directed to the replacement file /nre/usr/bin/foo.txt, ensuring that the incompatible files of the versioned WPAR 104 (i.e., the original file and the new version of the original file linked to the earlier version of the operating system) are persistently replaced with the replacement file that is compatible with the global operating system kernel 102. In another implementation, the maintenance program 118 can itself replace the new version of the original files with the corresponding replacement files.

The replacement file replaces the new version of the original file irrespective of the software maintenance (e.g., new installation, reinstallation, partial installation, or patch of an existing software product) performed by the software maintenance unit 118. In some implementations, as depicted in the data storage unit 114D of FIG. 2, if the system maintenance causes the new version of the original file to be installed, the new version of the original file (i.e., the file /usr/bin/foo_A_B_C_2.txt) and the original file (i.e., the file /usr/bin/foo_A_B_C.txt) may both be stored in the data storage unit 114D. In other implementations, the new version of the original file may replace the original file (e.g., as the file /usr/bin/ foo_A_B_C.txt) and only the new version of the original file may be stored in the data storage unit 114D.

Figure 3:
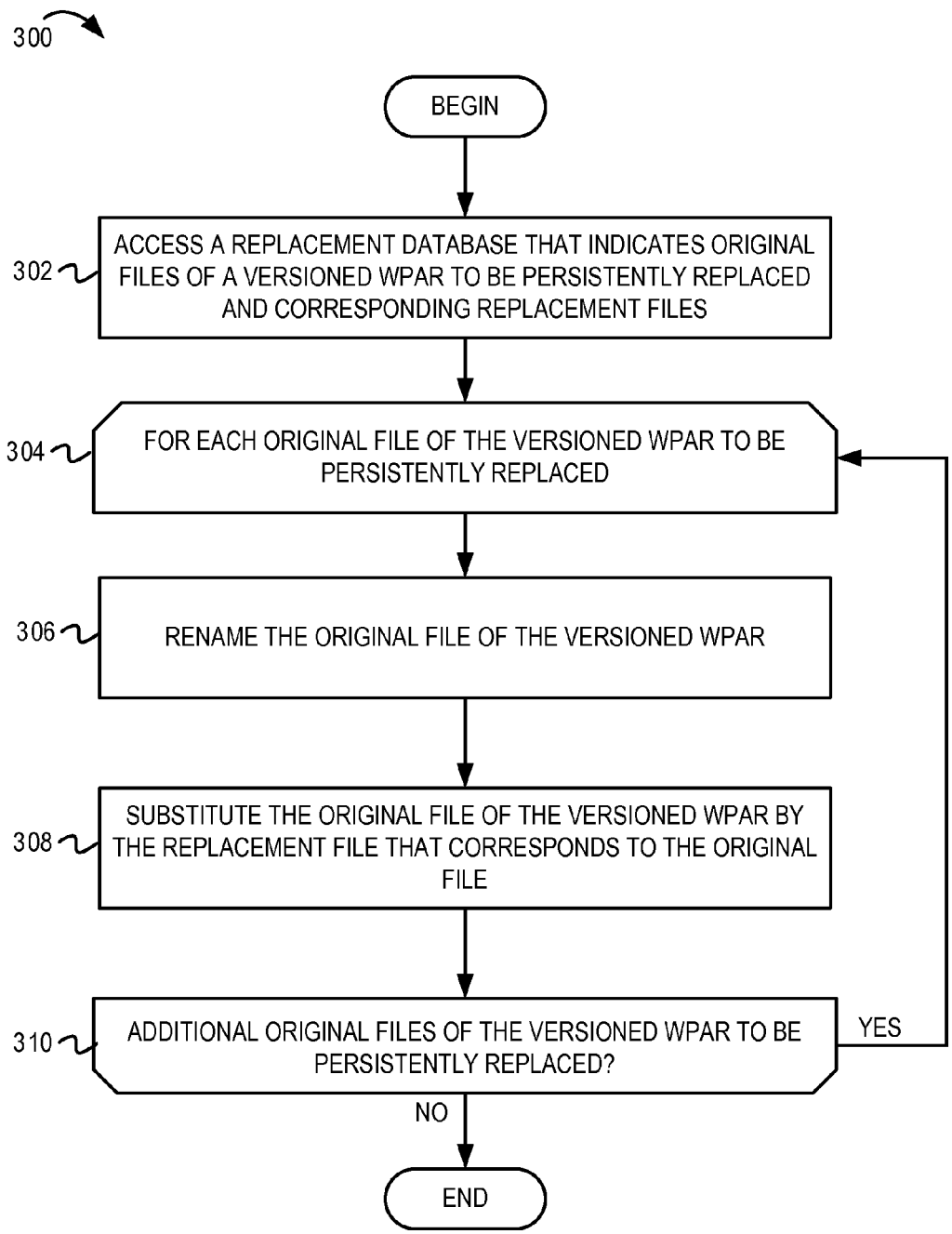
FIG. 3 is a flow diagram illustrating example operations for persistently replacing files in a versioned WPAR.

FIG. 3 is a flow diagram illustrating example operations for persistently replacing files in a versioned WPAR. Flow 300 begins at block 302.

A replacement database is accessed to identify original files of a versioned WPAR to be persistently replaced and corresponding replacement files (302). The original files may be specific to an earlier version of an operating system supported by the versioned WPAR and may not be compatible with a global operating system kernel. The incompatible original files of the versioned WPAR may need to be replaced with their corresponding replacement files that are compatible with the global operating system kernel. The replacement database identifies the original files, of the versioned WPAR, that are to be replaced and their corresponding replacement files. The flow continues at block 304.

A loop begins for each original file of the versioned WPAR to be persistently replaced (304). Operations described with reference to blocks 306-308 are executed for each original file of the versioned WPAR to be persistently replaced. Operations described herein for renaming each original file identified by the replacement database and replacing each original file with the corresponding replacement file may be executed when the versioned WPAR is created. The flow continues at block 306.

The original file of the versioned WPAR is renamed (306). The original file can be renamed in accordance with a predetermined scheme so that the renamed original file can be identified. In one implementation, a known prefix and/or known suffix can be affixed to the name of the original file. For example, original file foo.txt can be renamed to foo_O_v.txt. It is noted that although the name of the original file is changed, a location (on a data storage unit) at which the original file is stored may not be modified. In other words, the original file /usr/bin/foo.txt after being renamed can be accessed as /usr/bin/foo_O_v.txt. One of the original files that is persistently replaced is an original software maintenance program (represented as /usr/bin/install.exe in FIG. 1) associated with the versioned WPAR 104. The replacement software maintenance program (represented as /nre/usr/bin/install.exe in FIG. 1) comprises functionality to detect when replacement files will be affected by the software maintenance and to ensure that the replacement files are preserved even after the software maintenance is performed, as will be described in FIG. 4. The flow continues at block 308.

The original file of the versioned WPAR is substituted with the replacement file that corresponds to the original file (308). In one implementation, the original file may be directly accessed by processes within the versioned WPAR. To substitute the original file with the corresponding replacement file, a symbolic link file that references the replacement file can be created. The symbolic link file can replace the original file so that any references to the original file are directed to the symbolic link file which, in turn, references the replacement file. For example, a symbolic link file foo can be created to reference replacement file /replace/usr/bin/foo.txt instead of the original file /usr/bin/foo.txt. Thus, any references to foo will be directed to the replacement file /replace/usr/bin/foo.txt. The original file may only be accessible via direct reference under its new name (e.g., by referencing the original file /usr/bin/f_O_v.txt). In another implementation, the original file may itself be a symbolic link file and a new symbolic link file may be created to reference the replacement file. Furthermore, system maintenance metadata associated with the replacement file can be augmented to identify the original file that it replaced. In some implementations, system maintenance metadata associated with the original file may also be augmented to identify the replacement file. The flow continues at block 310.

It is determined whether additional original files of the versioned WPAR are to be persistently replaced (310). The replacement database can be accessed to determine whether all the original files identified in the replacement database have been persistently replaced with their corresponding replacement files. If it is determined that additional original files of the versioned WPAR are to be persistently replaced, the flow loops back to block 304, where a next original file to be persistently replaced is identified and operations described with reference to blocks 306-308 are executed for the identified original file. Otherwise, the flow ends.

Figure 4:
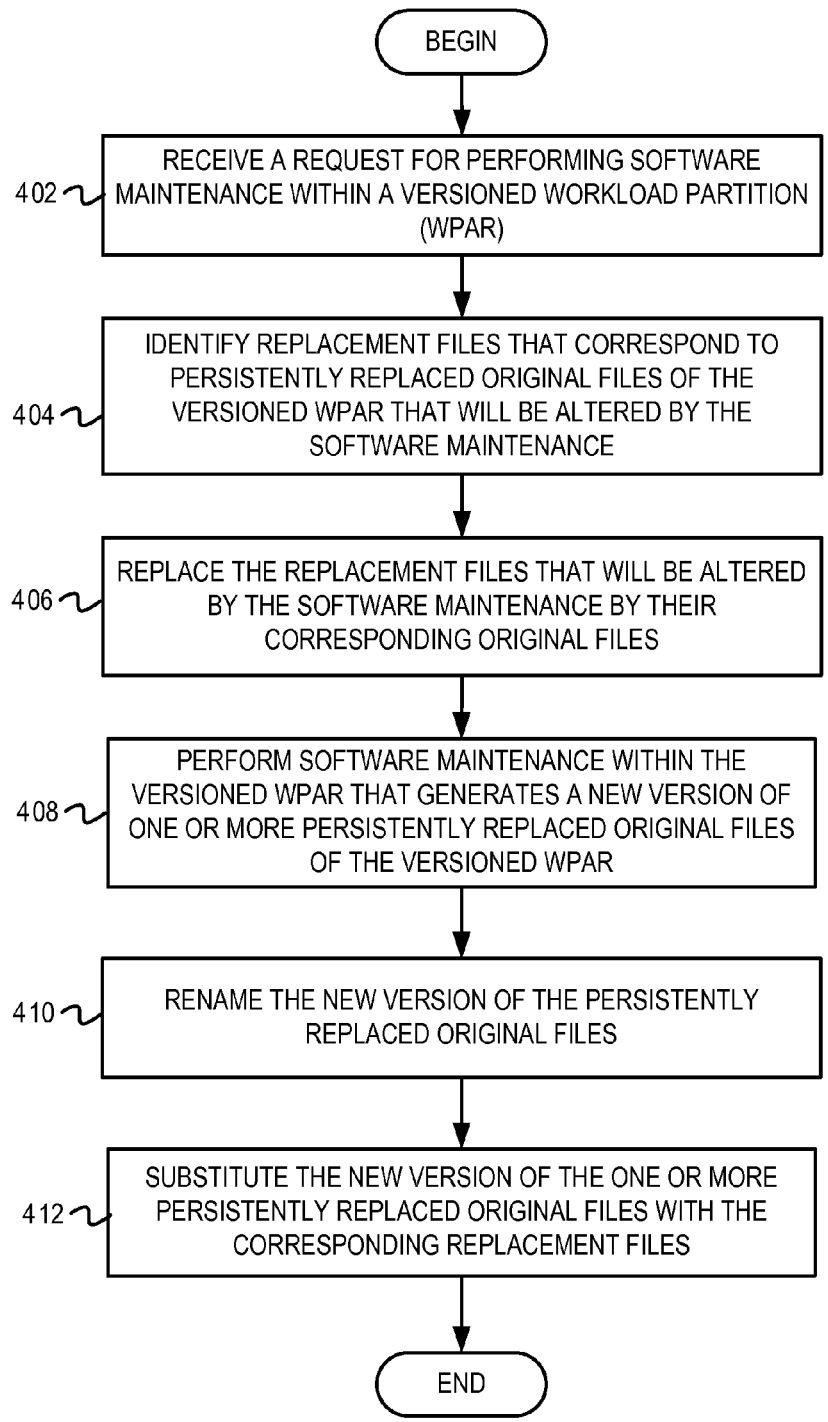
FIG. 4 is a flow diagram illustrating example operations for maintaining replacement files in the versioned WPAR.

FIG. 4 is a flow diagram illustrating example operations for maintaining replacement files in the versioned WPAR. Flow 400 begins at block 402.

A request for performing software maintenance within a versioned WPAR is received (402). The software maintenance can comprise installing a software product, re-installing/updating/patching/uninstalling/rejecting a previously installed software product, etc. The software maintenance can cause one or more original files within the versioned WPAR to be installed/modified. A global operating system kernel can invoke a software maintenance unit that executes a replacement software maintenance program for performing the software maintenance within the versioned WPAR. As described in FIG. 3, an original software maintenance program can be persistently replaced with the replacement software maintenance program to enable the software maintenance unit to execute operations described below. The flow continues at block 404.

One or more persistently replaced original files that will be altered by the software maintenance are identified (404). Replacement files that correspond to the persistently replaced original files that will be altered by the software maintenance are also identified. A replacement database that identifies the original files of the versioned WPAR and their corresponding replacement file can be accessed. Based on the replacement database, the one or more persistently replaced original files that will be altered by the software maintenance can be identified. For example, the list of original files and their corresponding replacement file, in the replacement database, may be traversed and it may be determined whether any of the replacement files will be altered by the software maintenance. As another example, one or more files that will be installed/modified by the software maintenance can be identified and the replacement database can be accessed to determine whether any of the files that will be installed/modified exist within the replacement database. As an example, it may be determined that the file /usr/bin/foo.txt will be altered by the software maintenance. Based on accessing the replacement database, it may be determined that the file /usr/bin/foo.txt was persistently replaced with replacement file /replace/usr/bin/foo.txt. The flow continues at block 406.

The identified replacement files that will be altered by the software maintenance are replaced with their corresponding original files (406). A symbolic link file that references the replacement file can be removed and the corresponding original file (that was renamed at block 306 of FIG. 3) can replace the replacement file. In some implementations, the symbolic link file can be updated to reference the original file instead of the replacement file. In some implementations, on identifying a persistently replaced original file that will be altered by the software maintenance, the replacement file can be renamed to preserve integrity of the replacement file. The flow continues at block 408.

The software maintenance is performed within the versioned WPAR (408). The software maintenance causes a new version of the persistently replaced original files to be installed. In some implementations, a new version of all the persistently replaced original files (identified at block 404) of the versioned WPAR may be installed. In other implementations, a new version of only some of the persistently replaced original files identified at block 404 may be installed. In other implementations, the version of the installed files may be the same version as that (or a previous version) of the previously renamed (at block 306 in FIG. 3) persistently replaced original files. The new version of the persistently replaced original files may or may not have the same name as that of their corresponding persistently replaced original file and replacement file. In some implementations, the software maintenance may also cause symbolic link files to be created to reference the respective new version of the persistently replaced original files. The software maintenance can also cause the persistently replaced original files to be modified, rejected, updated, etc. to yield the new version of the persistently replaced original files. However, the new version of the persistently replaced original files is still linked to an earlier version of the operating system that is supported by the versioned WPAR and, therefore like the original files, may be incompatible with the global operating system kernel. After the software maintenance is performed within the versioned WPAR, the new version of each of the persistently replaced original files is substituted with the corresponding replacement file as will be described below. The flow continues at block 410.

The new version of the persistently replaced original files is renamed (410). As described with reference to block 306 of FIG. 3, the new version of the persistently replaced original files can be renamed by affixing a known prefix and/or a known suffix to the name of the new version of the persistently replaced original files. In some implementations, the new version of the persistently replaced original files may replace the corresponding persistently replaced original file. In other implementations, both the persistently replaced original file and the new version of the persistently replaced original file may be stored. Furthermore, file size information, checksum information, and other characteristics associated with each of the previous versions (e.g., the persistently replaced original file and the new version of the persistently replaced original file) may also be preserved. The flow continues at block 412.

The new version of the persistently replaced original files is substituted with the corresponding replacement files (412). The symbolic link file that references the replacement file (removed at block 406) can be reinstituted. In some implementations, the symbolic link file can be updated to reference the replacement file instead of the new version of the persistently replaced original file. Now, subsequent references to the new version of the original file will be directed to the replacement file. From block 412, the flow ends.

It should be understood that the depicted diagrams (FIGS. 1-4) are examples meant to aid in understanding embodiments and should not be used to limit embodiments or limit scope of the claims. Embodiments may perform additional operations, fewer operations, operations in a different order, operations in parallel, and some operations differently. For example, although the FIGS. 1-2 refer to versions 7.1 and 5.2 of the AIX operating system, in other embodiments the global operating system can be any suitable later version of any suitable operating system, while the versioned WPAR can be associated with any suitable earlier version of the operating system. It is also noted that although FIG. 1 depicts the physical machine comprising one versioned WPAR 104, the physical machine can comprise any suitable number of WPARs. It is also noted that if the software maintenance unit 118 determines that none of the original files of the versioned WPAR 104 that will be altered by the software maintenance have been persistently replaced, the software maintenance unit 118 can perform software maintenance in the versioned WPAR 104 without executing operations for renaming and replacing files as described in stages D, E, and G.

It is noted that the replacement file may be patched or updated (e.g., to provide additional functionality) while still maintaining compatibility with the global operating system kernel 102 that hosts the versioned WPAR 104. Because the symbolic link file is created to link to the replacement file instead of the original file, when referenced by a requesting process within the versioned WPAR, any updates to the replacement file are automatically available to requesting processes within the versioned WPAR 104.

In some implementations, on identifying a persistently replaced original file that will be altered by the software maintenance, the replacement file can be renamed to preserve integrity of the replacement file and so that the replacement file can be restored after the software maintenance operations executed by the software maintenance unit 118 are complete. After software maintenance is completed, the previously replaced and renamed replacement files can be replaced again so that the replacement files can be referenced appropriately. For example, with reference to FIGS. 1-2, the replacement file /nre/usr/bin/foo.txt may be renamed to /nre/usr/bin/foo-_A_B_C.txt. After software maintenance within the versioned WPAR 104 is complete, the renamed replacement file /nre/usr/bin/foo_A_B_C.txt can be renamed again so that the replacement file is now /nre/usr/bin/foo.txt and the symbolic link file can be updated to reference the replacement file.

Furthermore, although examples refer to the replacement file being associated with the global operating system (i.e., the later version of the operating system) embodiments are not so limited. In other embodiments, the replacement file may not be associated with the global operating system. Instead, the replacement file can be a different version of the replaced original file and may still be associated with the earlier version of the operating system associated with the workload partition. For example, as described above with reference to FIG. 1, the original software maintenance program is replaced with the replacement software maintenance program. The original software maintenance program and the replacement software maintenance program may both be associated with the earlier version of the operating system executing within the versioned WPAR 104. The replacement software maintenance program may comprise additional functionality for handling the persistently replaced original files and their corresponding replacement files.

Lastly, it is noted that although FIGS. 1-4 describe operations for maintaining replacement files after software maintenance in a versioned WPAR, embodiments are not limited to versioned WPARs. The operations of FIGS. 1-4 described herein can be applied in any environment where files are to be persistently replaced. For example, AIX interim fix technology may replace an original file with a replacement file but system metadata (e.g., file characteristics such as file size, checksum information, etc.) may incorrectly reflect the original file instead of the replacement file. Consequently, the system may be in error because the file characteristics of the replacement file may not match the expected file characteristics indicated by the system metadata (i.e., the file characteristics of the original file). The operations for persistently replacing original files with corresponding replacement files can be implemented to accomplish interim fixes. The operations of FIGS. 1-4 described herein may also be implemented as part of a file replacement mechanism to maintain and keep track of different (e.g., earlier) versions of a file. The operations of FIGS. 1-4 can also be implemented in an environment where multiple versions of a file are available to perform a function. For example, the replacement file that persistently replaces the original file may be available within the environment in an alternate location. If the replacement file is to be used instead of the original file (e.g., because bugs in the original file are to be fixed), the operations described in FIGS. 1-4 can be implemented to replace the original file with the replacement file until further notice (e.g., until the bugs in the original file are fixed).

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
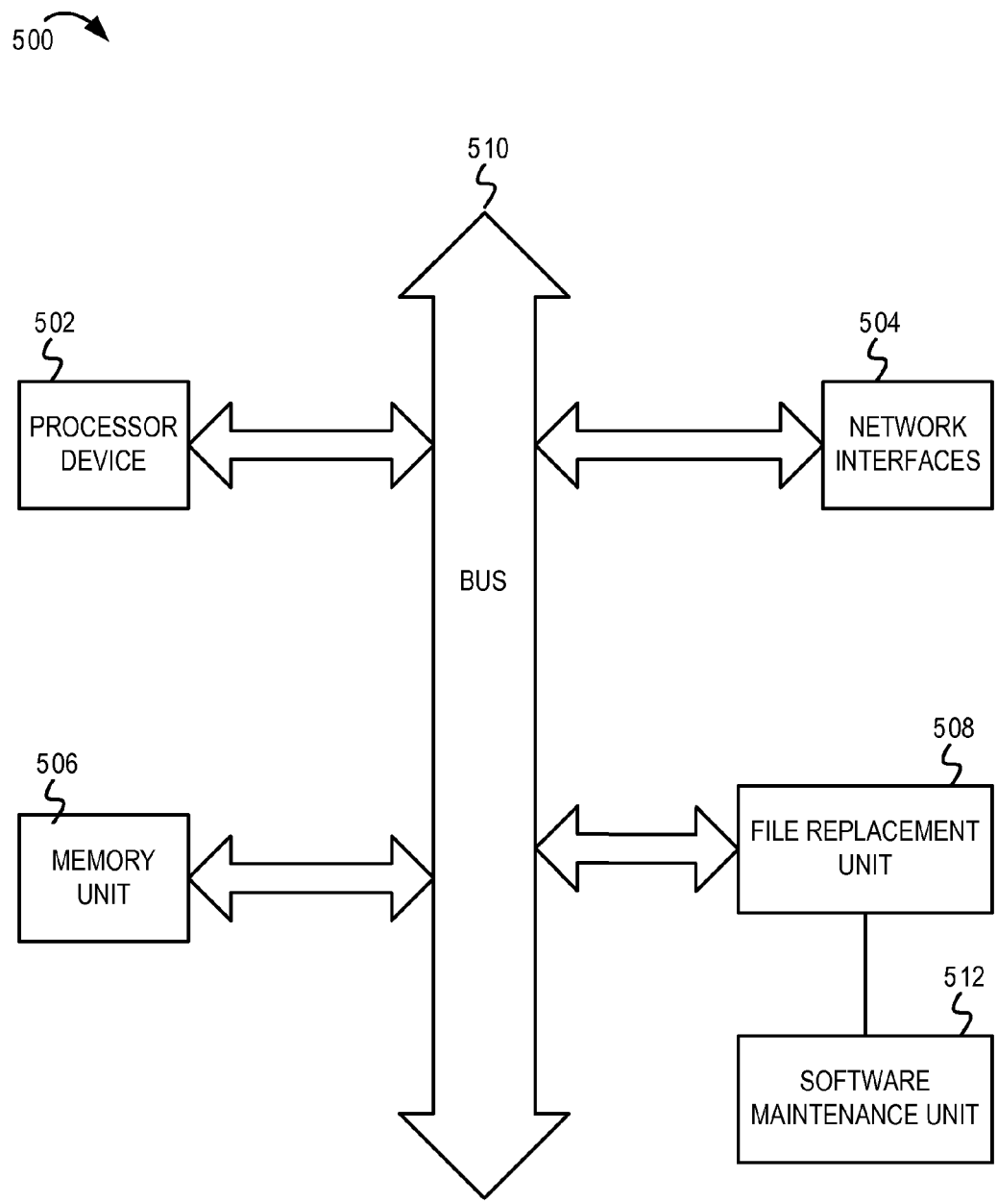
FIG. 5 is an example computer system configured for persistently replacing files and maintaining replacement files in a versioned WPAR.

FIG. 5 is a block diagram of one embodiment of a computer system 500 configured for persistently replacing files and maintaining replacement files in a versioned WPAR. In some implementations, the computer system 500 may be one of a personal computer (PC), a server, a laptop, a logical partition (LPAR), other physical electronic system, or virtual environment capable of accessing and providing content. The computer system 500 includes a processor unit 502 (possibly including multiple processors, multiple cores, multiple nodes, and/or implementing multi-threading, etc.). The computer system 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 500 also includes a bus 510 (e.g., PCI, ISA, PCI-Express, HyperTransport®, Infini-Band®, NuBus, AHB, AXI, etc.), and network interfaces 504 that include a wireless network interface (e.g., a WLAN interface, a Bluetooth® interface, a WiMAX interface, a ZigBee® interface, a Wireless USB interface, etc.) and/or a wired network interface (e.g., an Ethernet interface).

The computer system 500 also includes a file replacement unit 508 and a software maintenance unit 512. The file replacement unit 508 can identify an original file that is to be persistently replaced with a corresponding replacement file. The file replacement unit 508 can rename the identified original file and can create a symbolic link file to reference the replacement file instead of the corresponding original file. Additionally, the file replacement unit 508 can replace software maintenance procedures executed by the software maintenance unit 512 to cause the software maintenance unit 512 to execute replacement software maintenance procedures. In accordance with the replacement software maintenance procedures, the software maintenance unit 512, prior to performing software maintenance, can identify the replacement file that will be affected by the software maintenance. The software maintenance unit 512 can cause the identified replacement file to be renamed. After the software maintenance is performed, any new version of the persistently replaced original file can be renamed, the replacement file can be restored, and references to the replacement file can be restored.

It is noted that any one or more of the components of the file replacement unit 508 and the software maintenance unit 512 can be implemented in hardware and/or software on a common chip or integrated circuit, on separate chips and then coupled together, etc. Any one of these functionalities may be partially (or entirely) implemented in hardware and/or on the processor unit 502. For example, the functionality may be implemented with an application specific integrated circuit, in logic implemented in the processor unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the memory unit 506, and the network interfaces 506 are coupled to the bus 510. Although illustrated as being coupled to the bus 510, the memory unit 506 may be coupled to the processor unit 502.

While the embodiments are described with reference to various implementations and exploitations, it will be understood that these embodiments are illustrative and that the scope of the inventive subject matter is not limited to them. In general, techniques for persistent file replacement as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for persistent file replacement, the computer program product comprising:
    a non-transitory computer readable storage medium having computer usable program code embodied therewith, the computer readable program code configured to,
        identify, within a virtual operating system instance associated with an earlier version of an operating system, a replacement file that corresponds to an original file of the virtual operating system instance, wherein the earlier version of the operating system is earlier than a later version of the operating system associated with a kernel that supports the virtual operating system instance,
        wherein the computer readable program code configured to identify the replacement file that corresponds to the original file of the virtual operating system instance comprises the computer readable program code configured to determine that the original file of the virtual operating system instance will be altered by software maintenance procedures executed within the virtual operating system instance;
        in response to detecting an updated original file, rename the updated original file of the virtual operating system instance; and
        replace a first reference to the updated original file with a second reference to the replacement file.

2. The computer program product of claim 1, wherein the replacement file is associated with the later version of the operating system associated with the kernel.

3. The computer program product of claim 1, wherein the computer readable program code is configured to:
    temporarily replace the replacement file with the original file in response to the computer readable program code determining that the original file of the virtual operating system instance will be altered by software maintenance procedures executed within the virtual operating system instance.

4. The computer program product of claim 1, wherein the computer readable program code configured to identify the replacement file that corresponds to the original file of the virtual operating system instance further comprises the computer readable program code configured to:
    identify one or more original files of the virtual operating system instance that will be altered in response to the software maintenance procedures, wherein the one or more original files of the virtual operating system instance comprise the original file;
    for each of the one or more original files of the virtual operating system instance,
        determine whether the original file was persistently replaced with a corresponding replacement file associated with the later version of the operating system associated with the kernel.

5. The computer program product of claim 1, wherein the computer readable program code is further configured to:
    access a replacement database to identify one or more original files of the virtual operating system instance that are to be persistently replaced with corresponding ones of replacement files associated with the later version of the operating system associated with the kernel, wherein the one or more original files comprise the original file and wherein the corresponding ones of the replacement files comprise the replacement file;
    for each of the one or more original files of the virtual operating system instance that are to be persistently replaced, rename the original file of the virtual operating system instance; and
    replace the original file of the virtual operating system instance with the corresponding replacement file.

6. A system for maintaining a replacement file that persistently replaces a corresponding original file, the system comprising:

a processor;

a network interface coupled with the processor; and a file replacement unit coupled with the processor and with the network interface, the file replacement unit operable to:

identify, within a virtual operating system instance associated with an earlier version of an operating system, the replacement file that corresponds to the original file of the virtual operating system instance, wherein the earlier version of the operating system is earlier than a later version of the operating system associated with a kernel that supports the virtual operating system instance, wherein the file replacement unit operable to identify the replacement file that corresponds to the original file of the virtual operating system instance is in response to the file replacement unit determining that the original file of the virtual operating system instance will be altered by software maintenance procedures executed within the virtual operating system instance;

temporarily replace the replacement file with the original file in response to the file replacement unit determining that the original file of the virtual operating system instance will be altered by software maintenance procedures executed within the virtual operating system instance;

in response to detecting an updated original file, rename the updated original file of the virtual operating system instance; and replace a first reference to the updated original file with a second reference to the replacement file.

7. The system of claim 6, wherein the updated original file is generated in response to the software maintenance procedures executed within the virtual operating system instance.

8. The system of claim 6, wherein the file replacement unit comprises the computer readable storage medium.

* * * * *